Feb. 11, 1964   J. H. ZILLMAN ETAL   3,120,739
ROCKET PROPELLED ACTUATOR
Filed Aug. 15, 1960
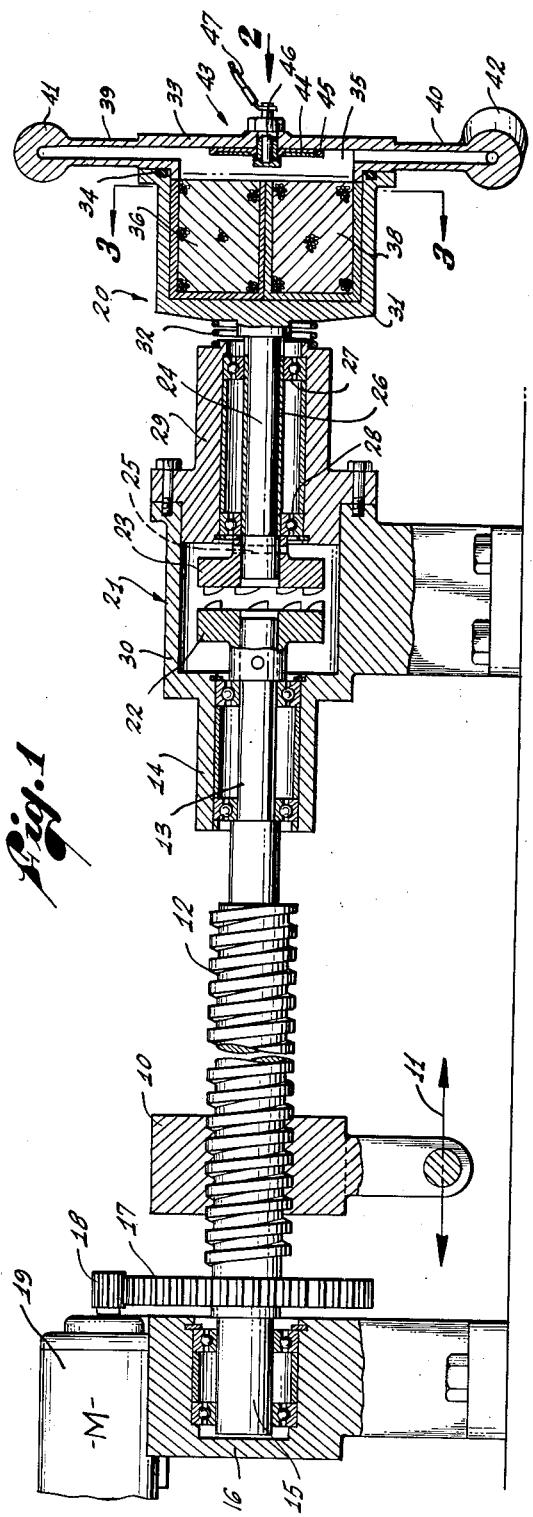
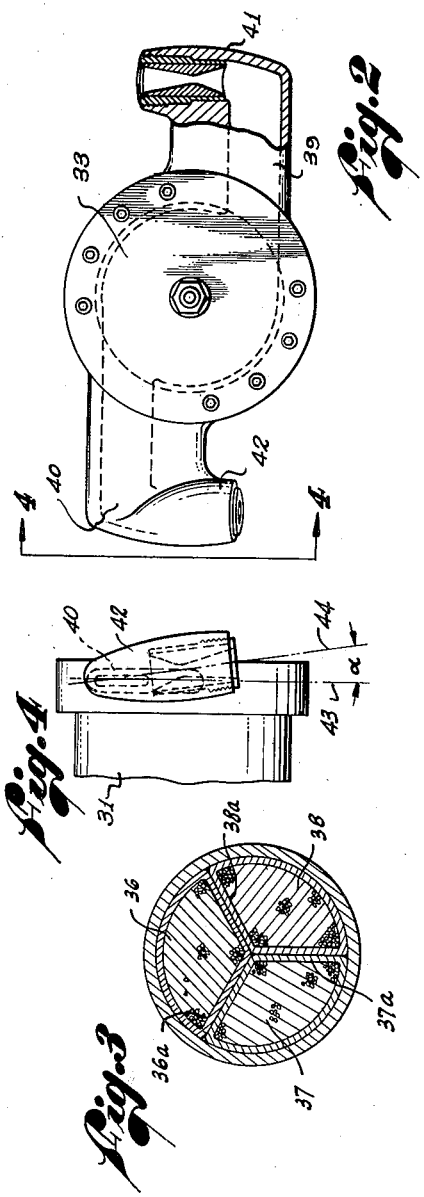
INVENTORS
JACK H. ZILLMAN
HARRY M. STEELE Jr.
BY Fulwider Mattingly & Huntley
ATTORNEYS United States Patent Office 3,120,739
Patented Feb. 11, 1964

3,120,739
ROCKET PROPELLED ACTUATOR
Jack H. Zillman, 324 Calle Mayor, Hollywood Riviera, Redondo Beach, Calif., and Harry M. Steele, Jr., 4422 N. 56th St., Phoenix, Ariz.
Filed Aug. 15, 1960, Ser. No. 49,539
7 Claims. (Cl. 60—39.35)

This invention is in the field of rocket propelled actuators. More particularly, this invention relates to a rocket propelled rotary or linear actuator especially suited for applications wherein the actuator is used only once after each fuel loading of its reaction motor. Such applications include, for example, emergency linear actuation of airplane or vehicle controls, bomb bay doors, or the like which are normally operated by other sources of power, and may also include such rotary type applications as the starting of various types of engines.

The present invention, in certain aspects, is an improvement over the invention disclosed and claimed in our prior United States Letters Patent No. 2,865,168 issued on December 23, 1958 and entitled "Fuel Burning Reaction Motor Powered Hydraulic and Electric Power Unit." In that patent there is disclosed and claimed a reaction motor wherein a rotatively mounted combustion chamber receives a body of fuel of less volume than the chamber and which has its burning surface spaced from one interior wall of the chamber to form a plenum chamber from which gases of combustion are supplied to a jet nozzle positioned tangentially with respect to the axis of rotation of said chamber so as to develop thrust which is applied as a pure torque to rotate said chamber.

The motor shown in said prior patent may be equipped with speed sensitive braking means to regulate the speed of rotation thereof and may be used for such applications as driving an electrical generator or other rotating machinery such as hydraulic pumps and the like.

In practice, it has been found that when the apparatus of the class described is operated at relatively high speeds, such as are frequently necessary in the actuator type of application described herein, the centrifugal force exerted on the fuel grain in the rotating combustion chamber may tend to deform the fuel body. Where the fuel used is one of the commonly available solid rocket fuels specified in the patent, it tends to have a plastic or rubber-like consistency and the deformation has been found to adversely affect the desired uniformity of burning of the fuel. In extreme cases, the deformation may be sufficient to cause cracking of the fuel. Should such cracking occur, it has been found that instead of the normal cigarette-like burning pattern, the fuel tends to burn rapidly into and along the surface of a crack thereby greatly increasing the overall mass burning rate of the fuel which may lead in extreme cases to explosion of the motor.

It is therefore an object of the present invention to provide a motor of the rotating combustion chamber type with a segmented fuel charge arrangement to promote a substantially uniform burning rate and to minimize the deformation effects of centrifugal forces.

It is a further object of this invention to provide a rocket or reaction motor adapted to drive a mechanical actuator at a predetermined substantially uniform rate.

It is a more specific object of this invention to provide such a rocket motor having normally disengaged clutch means positioned to apply power to a mechanical actuator when said clutch means are engaged by the application to said clutch of a component of thrust developed by a novel nozzle arrangement.

It is a still further object of this invention to provide improved ignition means for such an engine to further enhance the uniformity of burning of the fuel.

It is a further object of this invention to provide a rocket propelled actuator particularly suitable for emergency or single use applications.

The manner of attaining the foregoing and additional objects and advantages of the invention will be apparent from the following detailed description thereof, such consideration being given likewise to the attached drawing, in which:

FIGURE 1 is an elevational axial section of a rocket propelled actuator embodying the present invention.

FIGURE 2 is an end elevational view, partly broken away, and looking in the direction of the arrow 2 in FIGURE 1.

FIGURE 3 is a transverse sectional view taken on the line 3—3 in FIGURE 1.

FIGURE 4 is a fragmentary side elevational view taken generally in the direction of the arrows 4—4 in FIGURE 2 and particularly showing a canted arrangement of the jet nozzle.

Turning now to the drawing, there is shown an actuator 10 which is mounted for linear motion in the axial directions indicated by the arrow 11 and which is driven by the rotation of a threaded or screw type shaft 12. The threaded shaft 12 may conveniently have a first reduced end portion 13 mounted in a first bearing housing 14 and a second oppositely disposed reduced end portion 15 mounted in a second bearing housing 16. The bearing housings 14 and 16 are provided with any conventional bearing means such as ball bearing assemblies by which the shaft 12 may be journalled for rotation. It will, of course, be obvious that the direction of rotation of the shaft 12 determines the axial direction of motion of the actuator 10. It will further be understood that the actuator 10 may in turn be connected to actuate any desired mechanism such as the landing gear of an airplane, control surfaces, bomb bay doors, or the like.

Rigidly attached to the shaft 12 is a gear 17 which is driven by a pinion gear 18 rigidly mounted on the output shaft of a motor or other motive source 19. The motor or other conventional motive source 19 is, in the present illustrative embodiment, the normal means of supplying power to the actuator 10. Of course, the direction of rotation of the motor 19 will control the axial direction of motion of actuator 10.

During normal operation the actuator 10 is moved backwardly and forwardly as the motor 19 rotates the shaft 12. In certain applications, however, the failure of either the motor 19 itself or of the means for supplying power to it can be of such critical importance to the overall equipment in which the actuator is used, that it is desirable to provide auxiliary emergency means for supplying power to drive the actuator 10.

Such emergency actuating means, as shown in the drawing, may constitute the reaction motor 20 and the clutch coupling assembly 21. The clutch is biased by a compression spring 32 to a normally disengaged position so that the reaction motor 20 does not constitute a load during the normal operation of the motor 19. The clutch in the present illustration is of the sprag type and is driven into engaged relationship by an axial component of thrust developed from the operation of the reaction motor 20 in a manner to be described in detail below.

The clutch 21 may conveniently comprise a first clutch plate member 22 which is rigidly attached to the end of the reduced portion 13 of shaft 12 and a second clutch plate member 23 which is mounted for rotation with a shaft 24 by a shear pin 25. The shaft 24 is slidably mounted in a sleeve member 26 which is fixed to the inner races of ball bearing assemblies 27 and 28. The outer races of the ball bearing assemblies 27 and 28 are in turn mounted in a housing member 29 which is rigidly attached to the clutch housing 30 formed as an integral continuation of the bearing housing 14 of shaft 12.

The shaft 24 is rigidly attached to the combustion chamber 31 of the reaction motor 20 so that when the combustion chamber 31 rotates it will in turn rotate the shaft 24 and clutch plate 23. The assembly of the clutch plate 23, shaft 24, and combustion chamber 31 is normally held in the position shown in FIGURE 1 in which the clutch is disengaged by the compression spring 32 which bears against both the housing 29 and the combustion chamber 31.

As will be described in more detail, the operation of the reaction motor 20 generates an axial component of thrust which compresses the spring 32 and slides the shaft 24 axially in the sleeve 26 so that the clutch plate 23 is held firmly in engaged relationship with the clutch plate 22. The torque or rotary component of thrust generated by the operation of the reaction motor 20 is then transmitted through shaft 24 and clutch 21 to the shaft 12 to supply power to the actuator 10. Of course, when the actuator is driven by the reaction motor 20, the normally used actuating motor 19 is idle and will itself be driven by reaction motor 20. If an excessive load is placed on the shaft 12 while the clutch 21 is engaged and the reaction motor 20 is in operation, as occurs, for example, when the actuator 10 reaches the end of its stroke, the shear pin 25 will be sheared and the shaft 24 will simply rotate freely in the bore of the clutch member 23.

The reaction motor 20 is preferably of the solid fuel burning type wherein a segmented generally cylindrical shape fuel charge is received with the rotatably mounted combustion chamber 31. The fuel charge is inserted into the combustion chamber 31 through the rear thereof, the rear head or wall member 33 being threadedly attached to the combustion chamber 31 for removal to permit insertion of the fuel charge. An O-ring 34 or any other conventional sealing means may be used to render the threaded connection gas tight.

As may best be seen in FIGURE 1, the cylindrical charge is somewhat shorter than the interior length of the combustion chamber whereby to leave a plenum chamber 35 within the combustion chamber to the right of the fuel charge.

The active segments such as the segments 36, 37 and 38 of the fuel charge may be comprised of a rubber-like substance containing combustional materials and its own source of oxygen. Fuel of this type is employed, among other places, in the expendable rocket motors employed in jet-assisted take-offs in aircraft. Inasmuch as the exact formula of the material making up the charge is not an essential part of the present invention, it is deemed unnecessary to set forth such formulae herein. Suffice it to say that the material of which the charge segments 36, 37, and 38 are composed may be of either of the formulae specified in the United States military specifications AN–252–J and/or AN–2011. Of course it will be understood that any other equivalent or suitable monopropellent fuel may be used.

As will be noted from FIGURES 1 and 3, the fuel segments are individually and separately encased or wrapped in a continuous layer of inhibitor material such as the inhibitor layers 36a, 37a, and 38a. Of course it will be understood that the illustrated division of the cylindrical charge into three segments symmetrical about the cylindrical axis of the charge is illustrative only and that any desired number of segments can be used in any suitable arrangement. The material from which the inhibitor layers or casings are constructed is preferably a synthetic rubber or any similar combustible, but slow burning material.

It will be noted from FIGURE 3 that the wedge shaped segments 36, 37, and 38 in their individual casings of inhibitor material fit together to form the cylindrical fuel charge in such a fashion that the adjacent, contiguous portion of the casings of the inhibitor material form double thickness wall which extend axially throughout the fuel charge and provide a reinforcing structure to resist the tendency of the centrifugal force to deform the material. It has been found that this arrangement somewhat reduces the tendency toward deformation of the shape of the fuel charge with the attendant variation in burning rate and also materially reduces the likelihood of cracking of the fuel during rotation of the combustion chamber. Any deformation which does occur results in separation at the inhibited interface between adjacent segments and thus does not increase the burning surface of the fuel itself.

Extending radially, outwardly from the plenum chamber 35 are a pair of oppositely disposed arm members 39 and 40 each of which carries a jet nozzle 41 and 42 respectively positioned at the end of the arm member in such a fashion that the discharge of gases from the plenum chamber 35 through the hollow interior of the arm members and thence through the nozzles will produce thrust having a large torque component tending to cause rotatation of the combustion chamber 31 about its axis of symmetry extending along the axial shaft 24 and a smaller component of axial thrust tending to drive the combustion chamber 31 and shaft 24 to the left as seen in FIGURE 1 to drive the clutch 21 into engaged relationship.

The above described two components of thrusts are achieved by slightly canting each of the jet nozzles in a manner which may be seen most clearly in FIGURES 2 and 4. Referring particularly to FIGURE 4, it will be noted that if the direction of discharge of the nozzle 42, for example, were directed exactly along the line 43 which lies in a plane perpendicular to the axis about which the chamber 31 is to be rotated and which is tangent in that plane to the circular path of rotation of the center of the jet nozzle, then the thrust would be a pure torque which would cause rotation of the chamber 31 about the axis defined by shaft 24 but would not produce any axial component of thrust. Actually, however, as seen in FIGURE 4, the nozzle 42 is positioned so that it discharges gases along the direction defined by the line 44 which makes an angle alpha with the line 43. That is to say, the nozzle 42 (and similarly the nozzle 41) are canted at an angle alpha to the purely tangential positioning represented by the line 43. The magnitude of the component of axial thrust resulting from this positioning will be proportional to the total thrust times the sine of the angle alpha.

When the reaction motor 31 is placed in operation by actuation of its ignition system 43, the chamber 31 begins to rotate and simultaneously to urge the clutch 21 into engaged relationship. By this arrangement the reaction motor 20 is started under no-load conditions and the clutch 21 is automatically engaged when the axial component of thrust developed by the canted nozzle arrangement is sufficient to overcome the force exerted by the spring 32. The parameters determining the time required between ignition of the motor and engagement of the clutch are, of course, the angle of cant of the jet nozzles, the total thrust developed, and the force exerted by spring 32.

The ignition system 43 of the reaction motor may be seen most clearly in FIGURE 1 and comprises a layer 44 of primer or black powder spread uniformly over an extended surface area of the rear wall 33 of the combustion chamber 31 so that the layer 44 extends in a plane parallel to the plane of the rear surface of the cylindrical fuel charge and is spaced from that surface substantially by the width of the plenum chamber.

In practice, it may be desirable to place the layer 44 of primer in a shallow pan or container 45 mounted on the rear wall 33. A squib or percussion cap 46 is positioned centrally of the layer 44 of primer and is connected for actuation by an electrical signal applied thereto over wire 47.

The squib 46 is provided with radially discharging parts so that when it is ignited it will discharge hot flame or gases over the entire surface of the layer 44 of primer thereby substantially simultaneously igniting all of the extended surface area of primer. The primer in turn is so positioned that the flame and hot gases of combustion resulting from its ignition will fall on all portions of the rear surface of the main fuel charge at substantially the same time so that the full charge will be ignited in a manner such as to promote a uniform cigarette type burning of its entire rearward exposed surface. This has been found to result in a more uniform mass burning rate and hence a more uniform rated thrust development.

Although a linear type of actuator has been shown in FIGURE 1, it will, of course, be understood that the shaft 12 could also be directly connected to a load such as a rotary mechanical actuator of the type required, for example, in such applications as engine starting and the like. It will also be understood that such features as the specific type of clutch arrangement used, the specific chemical composition of the fuel, etc., may readily be varied by those skilled in the art to meet the needs of a particular application.

Furthermore, although the preferred illustration embodiment shown herein utilizes a pair of jet nozzles each of which is canted to produce thrust having a major torque component and a minor axial component, it will be understood that other arrangements for achieving this end are possible. Thus, a single canted jet nozzle is sufficient for some applications. In other applications it is possible to produce pure torque by a main jet nozzle or nozzles and pure axial displacement by thrust developed from an auxiliary jet nozzle positioned to discharge gas in a purely axial direction.

While a particular exemplary preferred embodiment of the invention has been described in detail above, it will be understood that modifications and variations therein may be effected without departing from the true spirit and scope of the novel concepts of the present invention as defined by the following claims.

We claim:

1. A rocket propelled actuator comprising: a pressure tight combustion chamber receiving a body of fuel of less volume than said chamber and having means therein to support said body spaced from an interior wall portion of said chamber to form a plenum chamber adjacent said wall portion; bearing means supporting said chamber for rotation about a fixed axis; at least one jet nozzle communicated with said plenum chamber and positioned in the wall of said combustion chamber to cause rotation of said chamber when said fuel is burned; said body of fuel being partitioned into a plurality of separate segments by at least one layer of an inhibitor material; said segments of fuel being dimensioned and proportioned to tend to prevent cracking of said fuel by the centrifugal force from the rotation of said chamber and to thereby promote a substantially uniform burning rate of said fuel; a layer of primer powder on said interior wall portion opposite and spaced from an end surface of said body of fuel; means to ignite said layer of primer powder to in turn substantially simultaneously ignite all portions of the end surface of said body of fuel; actuator means; normally disengaged clutch means mounted to be engaged by axial motion of said chamber, said clutch means when engaged being connected to apply power derived from the rotation of said chamber to said actuator means; said jet nozzle being canted to produce an axial component of thrust which will displace said chamber axially and thereby engage said clutch means when said chamber has reached a predetermined rate of rotation.

2. A rocket propelled actuator comprising: a pressure tight combustion chamber adapted to receive a body of fuel of less volume than said chamber and having means therein to support said body spaced from an interior wall portion of said chamber to form a plenum chamber adjacent said wall portion; bearing means supporting said chamber for rotation about a fixed axis; at least one jet nozzle in the wall of said combustion chamber communicated with said plenum chamber and positioned to apply a component of torque to said combustion chamber to cause rotation of said chamber about said axis when said fuel is burned; said jet nozzle being canted with respect to said axis to also provide an axial component of thrust to said combustion chamber; actuator means; and clutch means to apply power derived from the rotation of said chamber to said actuator means, said chamber being free-rotating when said clutch is disengaged and said clutch means being yieldably biased to a disengaged position and being urged into engaged position by said axial component of thrust applied to said chamber when said fuel is burned whereby when said fuel is ignited said chamber builds up rotational momentum prior to engagement of said clutch.

3. Rocket propelled actuator means comprising: a screw type actuator; first motive means connected to normally drive said actuator; and emergency motive means comprising a pressure tight combustion chamber receiving a body of fuel of less volume than said chamber and having means therein to support said body spaced from an interior wall portion of said chamber to form a plenum chamber adjacent said wall portion, bearing means supporting said chamber for rotation about a fixed axis, at least one jet nozzle communicated with said plenum chamber and positioned in the wall of said combustion chamber to cause rotation of said chamber when said fuel is burned, normally disengaged clutch means mounted to be engaged by axial motion of said chamber, said clutch means when engaged being connected to apply power derived from the rotation of said chamber to said actuator means, said jet nozzle being canted to also produce an axial component of thrust which will displace said chamber axially and thereby engage said clutch means when said chamber has reached a predetermined rate of rotation.

4. In a reaction motor: a combustion chamber receiving a body of fuel to be burned therein to generate gases; at least one nozzle communicated with said combustion chamber to receive and discharge said gases to generate thrust; said combustion chamber being mounted for free rotation about an axis of symmetry thereof; said nozzle being canted with respect to a plane perpendicular to said axis to generate thrust having a component of torque rotating said combustion chamber about said axis and an axial component displacing said combustion chamber axially along said axis; normally disengaged power take-off means positioned to be engaged by said axial displacement of said combustion chamber; and yieldable means resisting said axial displacement whereby when said fuel is burned as aforesaid said chamber builds up rotational momentum before said power takeoff means is engaged as aforesaid.

5. A rocket propelled actuator comprising: a pressure tight combustion chamber adapted to receive a body of fuel of less volume than said chamber and having means therein to support said body spaced from an interior wall portion of said chamber to form a plenum chamber adjacent said wall portion; bearing means supporting said chamber for free rotation about an axis of symmetry thereof; first and second jet nozzles mounted in diametrically opposed relationship to one another in the wall of said combustion chamber, said nozzles each being communicated with said plenum chamber to receive and discharge gases generated therein and being positioned to cause rotation of said chamber when said fuel is burned; said nozzles also being canted with respect to a plane perpendicular to said axis to develop an axial component of thrust which is applied to said combustion chamber; actuator means; means operatively responsive to axial motion of said combustion chamber produced by said axial component of thrust to couple said actuator means to said combustion chamber to be driven thereby; and means yieldably resisting said axial motion of said combustion chamber whereby when said fuel is burned, said chamber builds up substantial rotational velocity before being coupled to said actuator as aforesaid.

6. A reaction motor comprising: a combustion chamber having a body of gas producing fuel therein and being mounted for free rotation on a given axis; power takeoff means including a normally disengaged clutch having a driving member carried by said chamber and an adjacent driven member connected to an object to be rotated and mounted for rotation about said axis; a thrust producing discharge nozzle in said chamber to discharge gas produced by burning said fuel, said nozzle being spaced radially from said axis to move in a circular orbit when said chamber rotates and having its discharge axis disposed at an acute angle to a line tangent to said orbit whereby to produce as a result of said discharge a major reaction thrust component tending to rotate said chamber about said axis and a minor component of such thrust in another direction; movable means responsive to said last named thrust component to engage said two clutch members to rotatively couple said chamber to said object to be rotated; and yieldable means resisting clutch-engaging movement of said last-named movable means whereby when said fuel is burned, said chamber reaches substantial rotary velocity before said clutch members engage.

7. Apparatus of the character described comprising: an actuator; a reaction motor of the type having a normally free rotating combustion chamber adapted to receive a body of fuel to be burned therein to generate a body of pressurized gas in said chamber; normally disengaged power take-off means operatively responsive to axial displacement of said combustion chamber to engage said actuator to be driven by said motor; jet means on said chamber connected to receive and discharge said pressurized gas, said jet means being oriented to apply both rotary and axial components of thrust to said combustion chamber when said fuel is burned; means to ignite said body of fuel; and yieldable means engaged with said chamber to resist said axial displacement thereof whereby when said fuel is ignited, engagement of said actuator is delayed until rotation of said chamber has commenced.

References Cited in the file of this patent

UNITED STATES PATENTS

| | | |
|---|---|---|
| 1,921,344 | Chilton | Aug. 8, 1933 |
| 2,561,670 | Miller | July 24, 1951 |
| 2,633,701 | Moores | Apr. 7, 1953 |
| 2,865,168 | Zillman | Dec. 23, 1958 |
| 2,939,275 | Loedding | June 7, 1960 |